United States Patent
Chang et al.

(10) Patent No.: US 10,891,211 B1
(45) Date of Patent: Jan. 12, 2021

(54) SYSTEMS AND METHODS FOR VERSION CONTROL OF PIPELINED ENTERPRISE SOFTWARE

(71) Applicant: Instabase, Inc., San Francisco, CA (US)

(72) Inventors: Shih Ping Chang, San Francisco, CA (US); David Edgar Lluncor, San Francisco, CA (US)

(73) Assignee: Instabase, Inc., San Francisco, CA (US)

( * ) Notice: Subject to any disclaimer, the term of this patent is extended or adjusted under 35 U.S.C. 154(b) by 0 days.

(21) Appl. No.: 16/942,486

(22) Filed: Jul. 29, 2020

(51) Int. Cl.
| | |
|---|---|
| G06F 9/48 | (2006.01) |
| G06F 11/36 | (2006.01) |
| G06F 8/71 | (2018.01) |
| G06F 9/445 | (2018.01) |
| G06F 8/41 | (2018.01) |

(52) U.S. Cl.
CPC ........ *G06F 11/3612* (2013.01); *G06F 8/4452* (2013.01); *G06F 8/71* (2013.01); *G06F 9/44505* (2013.01); *G06F 9/485* (2013.01)

(58) Field of Classification Search
USPC ....................................................... 717/130
See application file for complete search history.

(56) References Cited

U.S. PATENT DOCUMENTS

| | | | |
|---|---|---|---|
| 9,483,506 B2* | 11/2016 | Meacham | G06F 16/254 |
| 2013/0298130 A1* | 11/2013 | Pienaar | G06F 9/4887 |
| | | | 718/102 |
| 2014/0189641 A1* | 7/2014 | Anderson | G06F 8/71 |
| | | | 717/110 |
| 2018/0107525 A1* | 4/2018 | Govindaraju | G06F 8/71 |
| 2018/0143826 A1* | 5/2018 | Crabtree | G06F 11/3616 |
| 2019/0080016 A1* | 3/2019 | Avihail | G06F 16/972 |
| 2019/0138288 A1* | 5/2019 | Brealey | G06F 8/65 |
| 2019/0219701 A1* | 7/2019 | Embry | G01M 3/38 |
| 2019/0317757 A1* | 10/2019 | Jodoin | G06F 8/60 |
| 2019/0361697 A1* | 11/2019 | Hu | G06F 11/3051 |
| 2019/0377570 A1* | 12/2019 | Govindaraju | G06F 9/52 |
| 2020/0042299 A1* | 2/2020 | Atkinson | G06F 8/70 |
| 2020/0202006 A1* | 6/2020 | Shah | G06F 8/77 |

* cited by examiner

*Primary Examiner* — John Q Chavis
(74) *Attorney, Agent, or Firm* — Esplin & Associates, PC

(57) ABSTRACT

Systems and methods for version control of pipelined enterprise software are disclosed. Exemplary implementations may: store information for executable code of software applications that are installed and executable by users, receive first user input from a first user that represents selection by the first user of a first software pipeline for execution; receive second user input from a second user that represents a second selection by the second user of a second software pipeline for execution, wherein the second software pipeline includes different versions of software applications that are included in the first software pipeline; facilitate execution of the first software pipeline for the first user; and facilitate execution of the second software pipeline for the second user at the same time as the execution of the first software pipeline for the first user.

16 Claims, 7 Drawing Sheets

| Applications: | User 1 | User 2 | User 3 |
|---|---|---|---|
| Application A | ✓ | ✓ | ✓ |
| Application B1 | ✓ | ✗ | ✗ |
| Application B2 | ✗ | ✓ | ✓ |
| Application C1 | ✓ | ✓ | ✗ |
| Application C2 | ✗ | ✗ | ✓ |

User interface 50 action button 52

*Fig. 5*

SYSTEMS AND METHODS FOR VERSION CONTROL OF PIPELINED ENTERPRISE SOFTWARE

FIELD OF THE DISCLOSURE

The present disclosure relates to systems and methods for version control of pipelined enterprise software.

BACKGROUND

Distributing consumer software is known. Using one of separate installations of separate and different versions of consumer software is known.

SUMMARY

One aspect of the present disclosure relates to a system configured for version control of pipelined enterprise software. The system may include electronic storage, one or more hardware processors, and/or other components. The electronic storage may be configured to store information. The stored information may include executable code of software applications that are installed and executable by the users. Sets of interconnected individual software applications may form software pipelines. The stored executable code of the software applications may include one or more of a first software application, a second software application, a third software application, a fourth software application, and/or other software applications, at the same time. A first software pipeline may include the first software application followed by the second software application followed by the fourth software application such that, in the first software pipeline, output generated by the first software application is used as input for the second software application, and further such that output generated by the second software application is used as input for the fourth software application. A second software pipeline may include the first software application followed by the third software application followed by the fourth software application such that, in the second software pipeline, output generated by the first software application is used as input for the third software application, and further such that output generated by the third software application is used as input for the fourth software application. The one or more hardware processors may be configured by machine-readable instructions to receive first user input from a first user. The first user input may represent selection by the first user of the first software pipeline for execution and/or launching. The one or more hardware processors may be configured by machine-readable instructions to receive second user input from a second user. The second user input may represent a second selection by the second user of the second software pipeline for execution and/or launching. The one or more hardware processors may be configured by machine-readable instructions to facilitate execution of the first software pipeline for the first user. The one or more hardware processors may be configured by machine-readable instructions to facilitate execution of the second software pipeline for the second user.

Another aspect of the present disclosure relates to a method for version control of pipelined enterprise software. The enterprise software can be used by users. The users may include a first user and a second user. The method may include storing information. The stored information may include executable code of software applications that are installed and executable by the users. Sets of interconnected individual software applications may form software pipelines. The stored executable code of the software applications may include one or more of a first software application, a second software application, a third software application, a fourth software application, and/or other software applications, at the same time. A first software pipeline may include the first software application followed by the second software application followed by the fourth software application such that, in the first software pipeline, output generated by the first software application is used as input for the second software application, and further such that output generated by the second software application is used as input for the fourth software application. A second software pipeline may include the first software application followed by the third software application followed by the fourth software application such that, in the second software pipeline, output generated by the first software application is used as input for the third software application, and further such that output generated by the third software application is used as input for the fourth software application. The method may include receiving first user input from a first user. The first user input may represent selection by the first user of the first software pipeline for execution. The method may include receiving second user input from a second user. The second user input may represent a second selection by the second user of the second software pipeline for execution. The method may include facilitating execution of the first software pipeline for the first user. The method may include facilitating execution of the second software pipeline for the second user.

As used herein, any association (or relation, or reflection, or indication, or correspondency) involving servers, processors, client computing platforms, software applications, pipelines, versions, steps, tasks, documents, formats, selections, determinations, comparisons, analyses, improvements, reductions, presentations, notifications, user interfaces, user interface elements, portions, fields, character sequences, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates an exemplary user interfaces as may be provided to facilitate version control of pipelined enterprise software, in accordance with one or more implementations.

DETAILED DESCRIPTION

Figure 1:
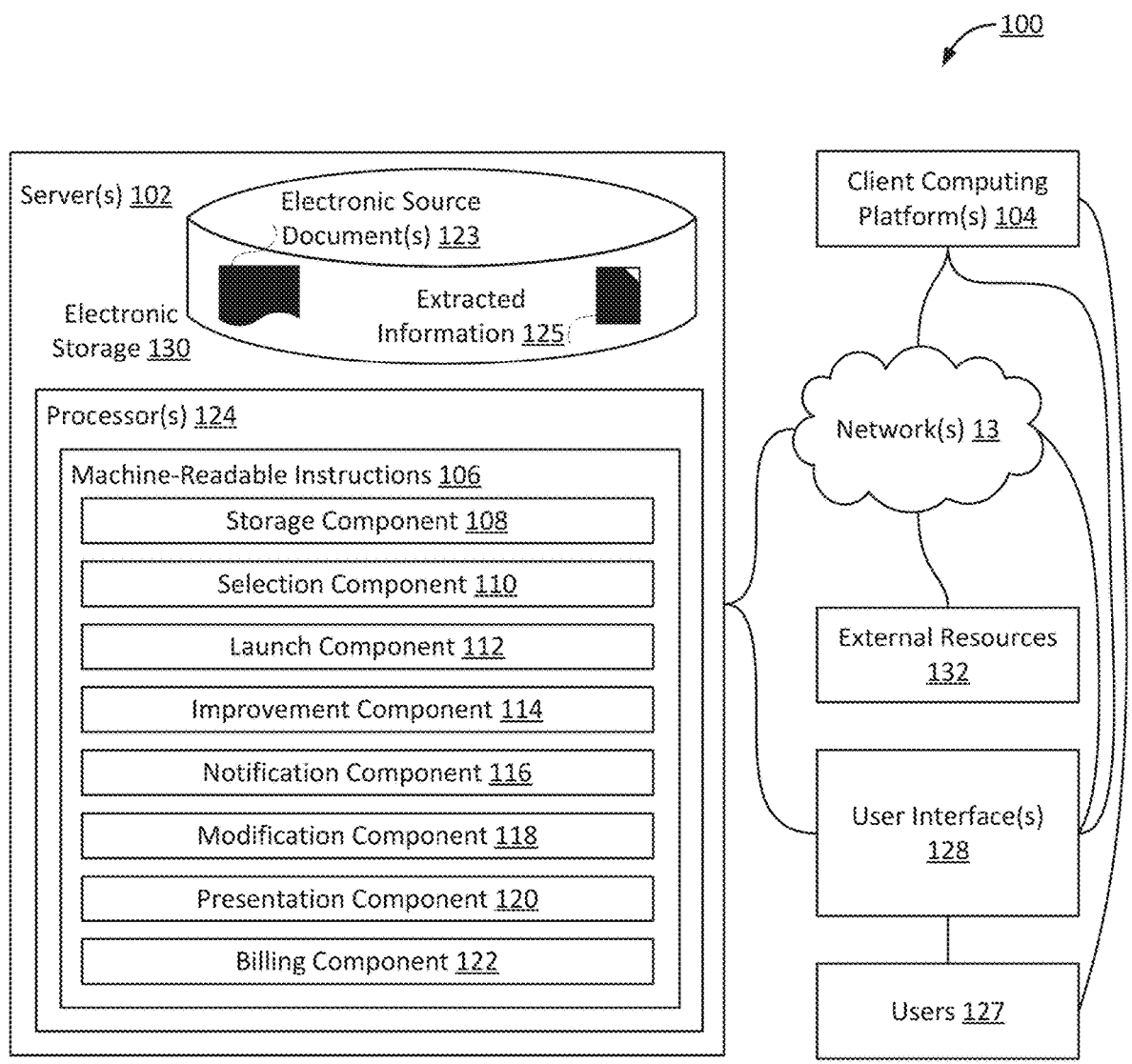
FIG. 1 illustrates a system configured for version control of pipelined enterprise software, in accordance with one or more implementations.

FIG. 1 illustrates a system 100 configured for version control of pipelined enterprise software, in accordance with one or more implementations. For consumer software, an individual installation of a specific version of a software application, installed on one or more particular computing devices, may be common, but this model and/or mechanism of distribution and/or usage may not work well, or may not be adequate and/or flexible enough for enterprise software. Enterprise software may be distributed among enterprises, corporate clients, and/or other groups of employees or other people interacting and/or working together. As used herein, a corporate client may refer to a group of people working together and/or sharing some responsibilities and/or goals as a group. For example, a corporate client may refer to a corporation, a company, a business, an enterprise, a government entity, a partnership, an organization, and/or another group of people working together and/or sharing some responsibilities and/or goals as a group. In some implementations, a corporate client may include and/or form a legal entity, or be associated with a legal entity.

As used herein, an instance of enterprise software may simply be referred to as a software application. In some implementations, software applications may include executable code of (machine-readable) instructions that may form a program. In some implementations, executable code and/or instructions may be executed by a processor to perform one or more particular features, tasks, and/or functionality. As used here, a processor is a machine and not a person. In some implementations, execution by a processor may include execution by a machine that is assisted, helped, controlled, managed, and/or otherwise jointly operated by a person. The software applications may include a first software application, a second software application, a third software application, a fourth software application, and so forth. In some implementations, multiple software applications may be interconnected and/or otherwise combined to form more elaborate software applications. For example, in some implementations, multiple software applications may be combined to form one or more pipelines of software applications. For example, in a software pipeline, the output and/or result produced and/or generated by a first software application may subsequently be used as input and/or source for a second software application, and so forth.

Figure 4A:
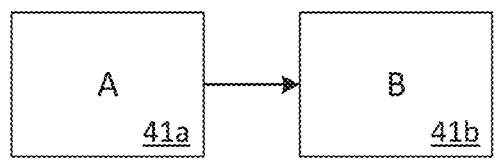
FIGS. 4A-4B-4C-4D-4E-4F-4G-4H illustrate exemplary software pipelines including multiple software applications, as may be used in a system configured for version control of pipelined enterprise software, in accordance with one or more implementations.
Figure 4B:
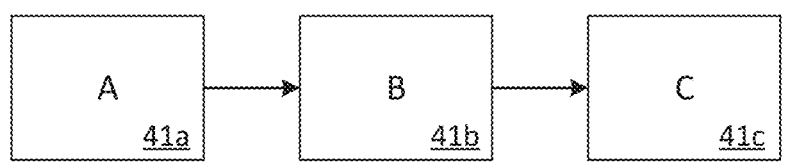
Figure 4C:
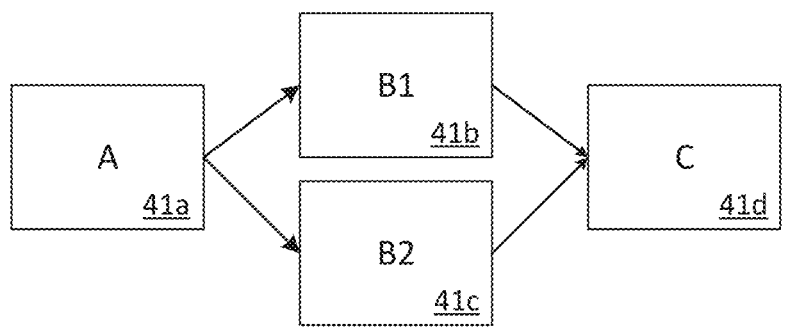
Figure 4D:
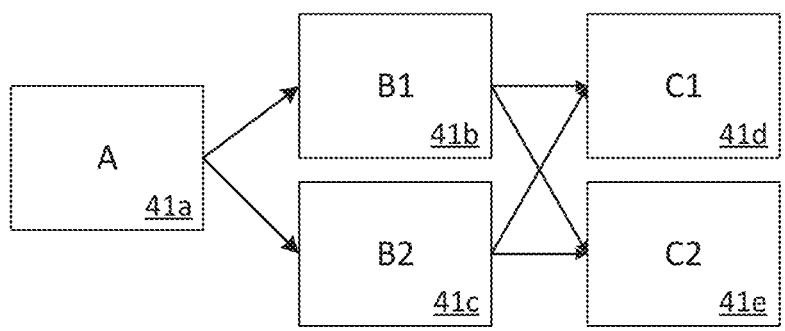
Figure 4E:
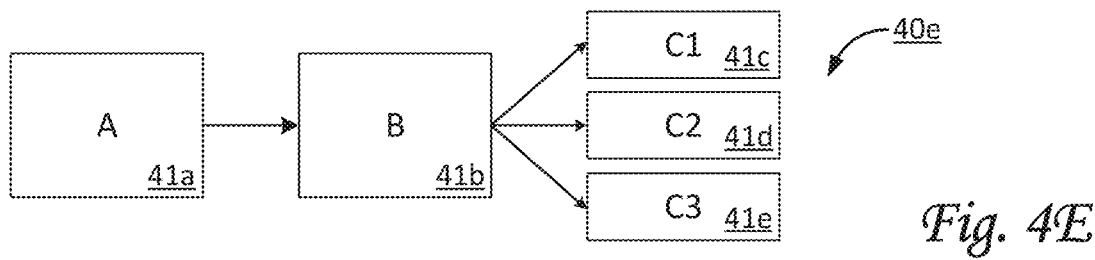
Figure 4F:
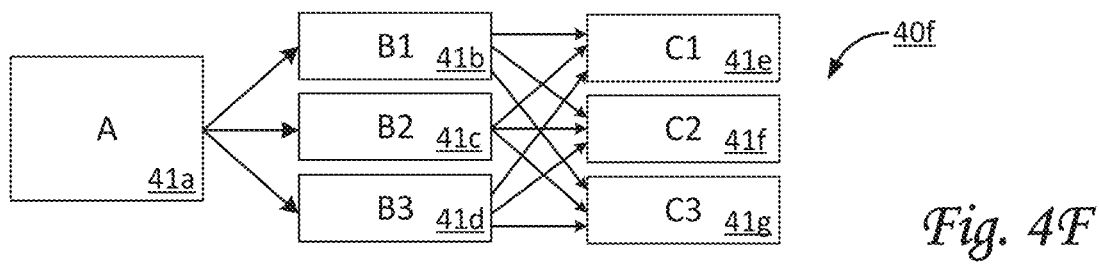
Figure 4G:
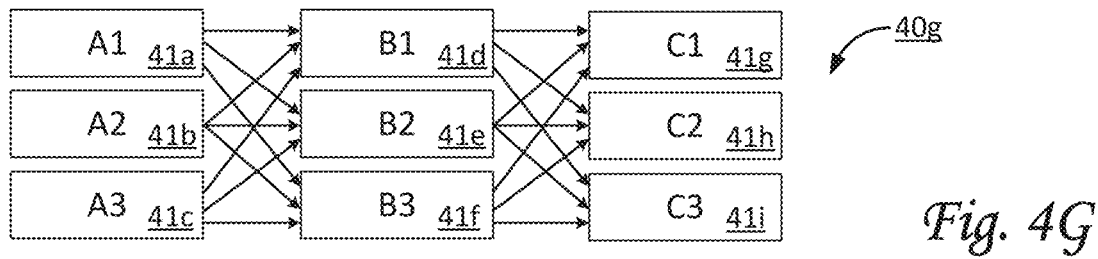
Figure 4H:
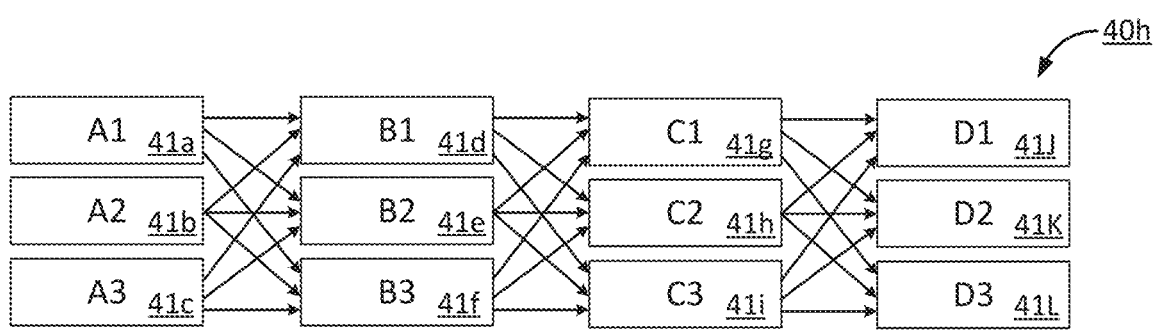

As used herein, individual components of a software pipeline may be referred to as software applications, even if an individual component is merely configured to perform one or more particular tasks and/or functions. By way of non-limiting example, FIG. 4A illustrates an exemplary software pipeline 40a including multiple software applications, as may be used by system 100. As depicted, software pipeline 40a includes a software application 41a (labeled "A"), followed by a software application 41b (labeled "B"). For example, the output and/or result produced and/or generated by software application 41a may function as an input and/or source for software application 41b. This concept of software pipelines may be extended, e.g. as illustrated in FIG. 4B, depicting an exemplary software pipeline 40b including multiple software applications, as may be used by system 100. Software pipeline 40b includes a software application 41a (labeled "A"), followed by a software application 41b (labeled "B"), followed by a software application 41c (labeled "C"). In some implementations, software pipelines may include options and/or choices for one or more features, tasks, and/or a particular functionality of the software pipeline. By way of non-limiting example, FIG. 4C depicts an exemplary software pipeline 40c including multiple software applications, as may be used by system 100. Software pipeline 40c includes a software application 41a (labeled "A"), followed by either a software application 41b (labeled "B1") or a software application 41c (labeled "B2"), either of which may be followed by a software application 41d (labeled "C"). By way of non-limiting example, FIG. 4D depicts one or more exemplary software pipeline(s) 40d including multiple software applications, as may be used by system 100. Software pipeline(s) 40d includes a software application 41a (labeled "A"), followed by either a software application 41b (labeled "B1") or a software application 41c (labeled "B2"), either of which may be followed by one of the following options: a software application 41d (labeled "C1"), or a software application 41e (labeled "C2"). By way of non-limiting example, FIG. 4E depicts one or more exemplary software pipeline(s) 40e including multiple software applications, as may be used by system 100. Software pipeline(s) 40e includes a software application 41a (labeled "A"), followed by a software application 41b (labeled "B"), followed by either a software application 41c (labeled "C1"), a software application 41d (labeled "C2"), or a software application 41e (labeled "C3"). By way of non-limiting example, FIG. 4F depicts multiple exemplary software pipelines 40f including multiple software applications, as may be used by system 100. Software pipelines 40f include a software application 41a (labeled "A"), followed by one of three software applications: a software application 41b (labeled "B1"), a software application 41c (labeled "B2"), or a software application 41d (labeled "B3"). These are followed by one of three software applications: a software application 41e (labeled "C1"), a software application 41f (labeled "C2"), or a software application 41g (labeled "C3"). By way of non-limiting example, FIG. 4G depicts multiple exemplary software pipelines 40g including multiple software applications, as may be used by system 100. Software pipelines 40g include a software application 41a (labeled "A1"), a software application 41b (labeled "A2"), and a software application 41*c* (labeled "A3"), which may be different versions of the same task, such that A1 is the oldest version, A2 is newer than A1, and A3 is newer than A2. Either of these software applications may be followed by one of three software applications: a software application 41*d* (labeled "B1"), a software application 41*e* (labeled "B2"), or a software application 41*f* (labeled "B3"), which may be different versions of the same or similar task, such that B1 is the oldest version, B2 is newer than B1, and B3 is newer than B2. Either of these may be followed by one of three software applications: a software application 41*g* (labeled "C1"), a software application 41*h* (labeled "C2"), or a software application 41*i* (labeled "C3"), which may be different versions of the same or similar task, such that C1 is the oldest version, C2 is newer than C1, and C3 is newer than C2. Accordingly, FIG. 4G may depict 27 distinct software pipelines. By way of non-limiting example, FIG. 4H depicts multiple exemplary software pipelines 40*h* including multiple software applications, as may be used by system 100. Software pipelines 40*h* include the same software applications as software pipelines 40*g*, with added software applications 41J, 41K, and 41L. Each of the software applications 41*g*, 41*h*, and 41*i* may be followed by one of three software applications: software application 41J (labeled "D1"), software application 41K (labeled "D2"), or software application 41L (labeled "D3"), which may be different versions of the same or similar task, such that D1 is the oldest version, D2 is newer than D1, and D3 is newer than D2. Accordingly, FIG. 4H may depict 81 distinct software pipelines. In some implementations, a set of software pipelines as depicted here, e.g. in FIG. 4H, may be included in the same stored executable code, so that all distinct software pipelines are available at the same time, to multiple users, without requiring installations or re-installations of any software applications. In some implementations, a single deployment of the stored executable code supports execution of all distinct software pipelines at the same time. For example, the same user may launch different pipelines at the same time (say, a first software pipeline and a second software pipeline) such that output generated by each of the different pipelines is presented to the same user at the same time.

Referring to FIG. 1, in some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. In some implementations, users 127 may access system 100 via client computing platform(s) 104. In some implementations, users 127 may access system 100 via user interfaces 128. Users 127 may include a first user, a second user, a third user, a fourth user, and/or other users. One or more of users 127 may be administrative users, such as a first administrative user, a second administrative user, a third administrative user, and so forth. One or more of the administrative users may be responsible and/or accountable for individual software applications that are used by one or more (other) users, in particular sets or subsets of users. In some implementations, one or more sets of users may be organized under one or more corporate clients. For example, a first set of users may be organized under a first corporate client, e.g. as the employees of the first corporate client. In some implementations, one or more sets of users may be organized under one or more organizational subdivisions of an individual corporate client. For example, a second set of users may be organized under a first subdivision of the first corporate client. As used herein, organizational subdivisions may be (based on) groups of employees (e.g., a research group, or the junior associates), departments (e.g., a compliance department), locations (e.g., the San Francisco office), and/or other entities within corporate clients or legal entities. In some implementations, an administrative user may be associated with one or more corporate clients and/or one or more organizational subdivisions of a corporate client.

In some implementations, individual ones of users 127 may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a storage component 108, a selection component 110, a launch component 112, an improvement component 114, a notification component 116, a modification component 118, a presentation component 120, a billing component 122, and/or other instruction components.

Storage component 108 may be configured to electronically store information. In some implementations, storage component 108 may be configured to electronically store information in electronic storage 130. In some implementations, stored information may include executable code of software applications. In some implementations, stored information may include binary code to install software applications. In some implementations, stored information may include executable code to install software applications. In some implementations, stored information may include installed software applications that are executable by users 127. In some implementations, the software applications may be organized in different sets and/or subsets, which may in some cases overlap, and in some cases be mutually exclusive. In some implementations, sets of interconnected individual software applications may form software pipelines. In some implementations, sets of interoperating individual software applications may form software pipelines. By way of non-limiting example, a first software pipeline may include three software applications as depicted in FIG. 4C, such that a first software application (here, software application 41*a*) is followed by a second software application (here, software application 41*b*), which is followed by a fourth software application (here, software application 41*d*). In the first software pipeline, output generated by the first software application is used as input for the second software application, and output generated by the second software application is used as input for the fourth software application. By way of non-limiting example, a second software pipeline may include three software applications as depicted in FIG. 4C, such that the first software application (here, software application 41*a*) is followed by a third software application (here, software application 41*c*), which is followed by the fourth software application (here, software application 41*d*). In the second software pipeline, output generated by the first software application is used as input for the third software application, and output generated by the third software application is used as input for the fourth software application. In some implementations, the second software application and the third software application, as described in this example, may perform different versions of the same one or more tasks. For example, the second software application may be an older version of a particular software application, and the third software application may be a newer version of the same software application (i.e., newer than the version of the second software application).

In some implementations, stored information may include one or more electronic source documents 123, extracted information 125, and/or other information. As used herein, documents may be referred to as "source documents" when the documents are originally published, generated, produced, communicated, and/or made available to users, or when the documents are copies thereof. Alternatively, and/or simultaneously, documents may be referred to as "source documents" when the documents are a source or a basis or a container for human-readable information. By way of non-limiting example, human-readable information may include characters and/or other information. In some implementations, characters may be grouped and/or otherwise organized into character sequences. By way of non-limiting example, such sequences may represent names, numbers, strings, and/or other information. As used herein, an electronic source document may be an electronic version of a source document (e.g., a scanned and/or photographed version of an original paper document and/or otherwise physical original document, or a copy of an original digital document). By way of non-limiting example, the electronic format of an electronic source document may be the Portable Document Format, or pdf. For example, a particular electronic source document may represent a bank statement (see for example FIG. 3). For example, a particular electronic source document may represent a financial record. For example, a particular electronic source document may represent a loan application. For example, a particular electronic source document may represent an employment record. For example, a particular electronic source document may represent a real estate transaction. For example, a particular electronic source document may represent a tax return. For example, a particular electronic source document may be a photocopy of a physical document from a government agency. For example, a particular electronic source document may include and/or be a captured and/or generated image and/or video.

Referring to FIG. 1, in some implementations, extracted information 125 may be stored in electronic storage 130, and may have been extracted and/or otherwise derived from documents, including but not limited to electronic source documents 123. As used herein, the term "extract" and its variants refer to the process of identifying and/or interpreting information that is included in a document, whether performed by determining, measuring, calculating, computing, estimating, approximating, interpreting, generating, and/or otherwise deriving the information, and/or any combination thereof. In some implementations, the extracted information may have a semantic meaning, including but not limited to opinions, judgement, classification, and/or other meaning that may be attributed to human interpretation. For example, in some implementations, extracted information need not literally be included in a particular electronic source document, but may be a conclusion, classification, and/or other type of result of (human and/or machine-powered) interpretation of the contents of the particular electronic source document. In some implementations, the extracted information may have been extracted by a software application (or document analysis process) that includes optical character recognition (OCR). Alternatively, and/or simultaneously, in some implementations, the extracted information may have been extracted by a software application (or document analysis process) that uses machine-learning (in particular deep learning) techniques. For example, (deep learning-based) computer vision technology may have been used. For example, a convolutional neural network may have been trained and used to classify (pixelated) image data as characters, and/or other types of information. In some implementations, the extracted information may have been extracted by a software application (or document analysis process) that uses a pipeline of steps (or software applications) for object detection, object recognition, and/or object classification. In some implementations, the extracted information may have been extracted by a software application (or document analysis process) that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., extracted information 125, may be stored in electronic storage 130.

In some implementations, extracted information 125 may include one or more sets of character sequences. By way of non-limiting example, such sequences may represent names, numbers, strings, and/or other information. In some implementations, extracted information 125 may include meta-information regarding individual ones of the characters or character sequences. By way of non-limiting example, the meta-information regarding an individual of the character sequences may include one or more of font type, font size, font weight, font color, typographical emphasis (e.g., italic, bold, etc.), letter case, capitalization, margins, alignment, spacing, and/or other meta-information. In some implementations, the meta-information may further include indications of levels of confidence in the reliability of the document analysis process used to extract particular extracted information. For example, the meta-information of an extracted character sequence may include an indication of the level of confidence (as determined by the document analysis process itself) in the accuracy of the results. For example, the meta-information of an extracted character sequence may include an indication of reliability (as determined by the document analysis process itself) of the results. For example, the meta-information of an extracted character sequence may include an indication of the level of accuracy (as determined by the document analysis process itself) of the results. In some implementations, the meta-information of an item of extracted information may represent a level of confidence of a machine-learning technique and/or rule-based technique used in a particular document analysis process. In some implementations, the meta-information of an item of extracted information may represent a sentiment attributed to some or all of the electronic source document. In some implementations, one or more of these indications may be represented by low, medium, or high levels. In some implementations, one or more of these indications may be represented, from low to high, by red, yellow, or green levels. In some implementations, one or more of these indications may be represented by numerical values between, say, 0 and 100, with 100 being the highest level (of confidence, reliability, accuracy, and/or other quality indications).

Figure 3:
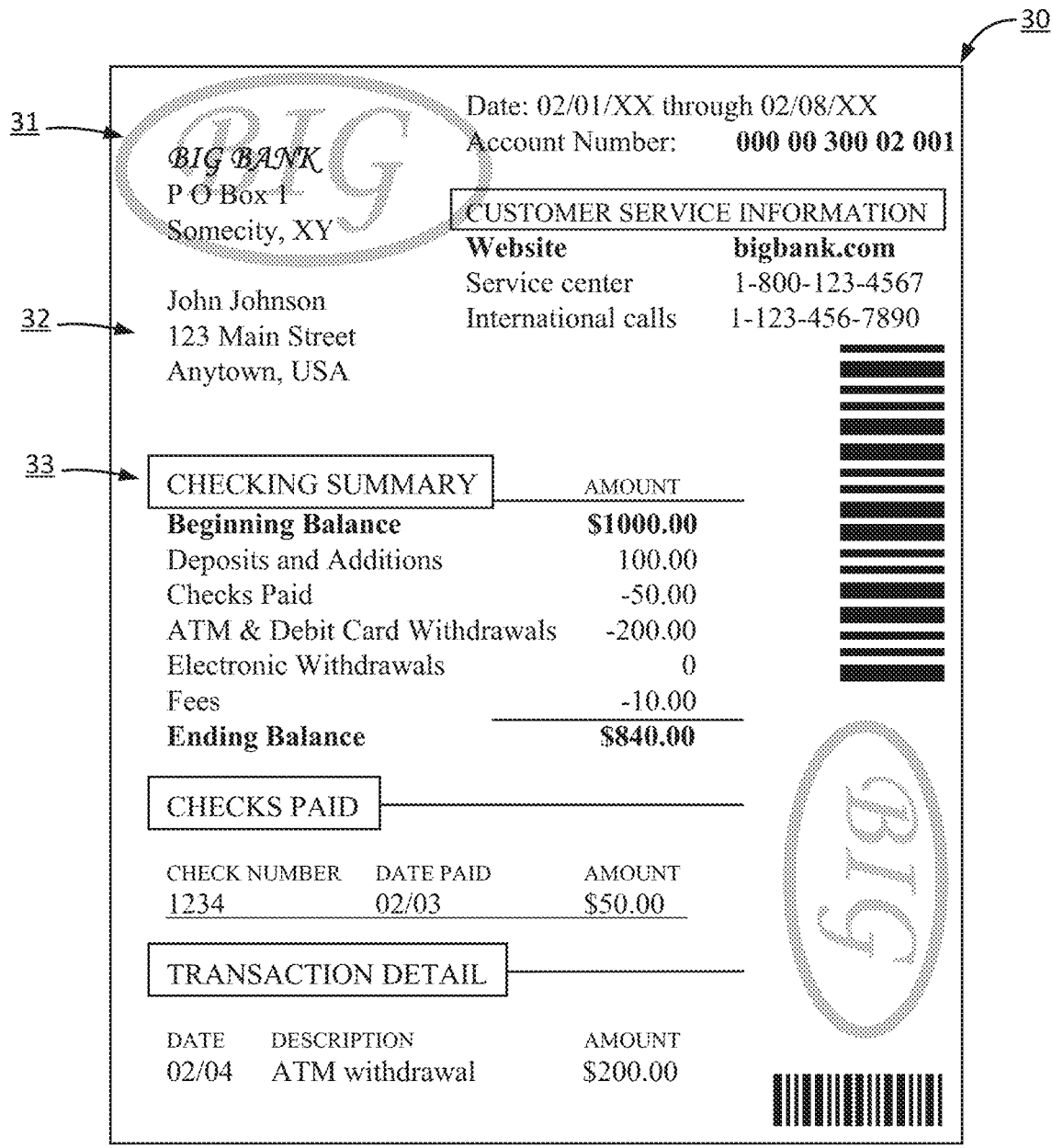
FIG. 3 illustrates an exemplary electronic document as may be used in a system configured for version control of pipelined enterprise software, in accordance with one or more implementations.

By way of non-limiting example, FIG. 3 illustrates an exemplary electronic source document 30 as may be used in system 100 (of FIG. 1), in accordance with one or more implementations. Exemplary electronic source document 30 may represent a bank statement from a particular bank, intended for a particular account holder, regarding a particular account of the particular account holder with the particular bank. The bank statement may include various familiar elements, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement. Extracted information 125 from exemplary electronic source document 30 may include one or more of the familiar elements discussed above. For example, the extracted information may include the combination of "account holder's name" and "John Johnson." As depicted here, the character sequence "John Johnson" may be interpreted as "account holder's name," even though the latter is not literally included in exemplary electronic source document 30. For example, the extracted information may include the combination of "Account Number" and "000 00 300 02 001." As depicted here, both these character sequences may be literally included in exemplary electronic source document 30.

By way of non-limiting example, referring to the first and second software pipelines depicted in FIG. 4C as described above, second software application 41b may be an older version of a software application that performs a similar task as third application 41c (which may be a newer version compared to second software application 41b). For example, the task may include one or more of performing OCR on documents, creating fields and/or records from an OCR'd document, finding address information in a document, finding account information in a document, performing identify verification, performing risk assessment, performing fraud detection, and/or other tasks that may be related to automated document processing and/or document analysis. As used herein, the term "automated" may include full and partial automation.

By way of non-limiting example, referring to the software pipelines depicted in FIG. 4D as described above, second software application 41b may be an older version of third application 41c, and a fourth software application 41d may be an older version of a fifth software application 41e. In other words, second software application 41b may be alternative version of third application 41c, and/or vice versa. Likewise, fourth software application 41d may be an alternative version of fifth software application 41e, and/or vice versa. Accordingly, in this example a first software pipeline may include the software applications labeled "A-B1-C1", a second software pipeline may include the software applications labeled "A-B1-C2", a third software pipeline may include the software applications labeled "A-B2-C1", and a fourth software pipeline may include the software applications labeled "A-B2-C2".

Referring to FIG. 1, selection component 110 may be configured to receive user input from users 127, e.g., through user interfaces 128. For example, selection component 110 may be configured to receive user input from one or more users. In some implementations, received user input may represent entry and/or selection of one or more software pipelines and/or software applications. In some implementations, a selected software pipeline and/or software application may be executed and/or launched. In some implementations, selection of a software pipeline and/or software application may effectuate execution and/or launching thereof (e.g., either on one or more servers 102, one or more client computing platforms 104, and/or on one or more other components of system 100). In some implementations, received user input may represent entry and/or selection of one or more sets and/or subsets of software applications. For example, a first user may select (through user input received by selection component 110) a first software pipeline for (subsequent) execution. For example, a second user may select (e.g., through user input received by selection component 110) a second software pipeline for (subsequent) execution, and so forth. In some implementations, user input from users 127 may effectuate execution and/or otherwise cause software pipelines and/or software applications to be executed. In some implementations, user input from the first user and the second user may be received by selection component 110 at the same time and/or contemporaneously. In some implementations, user input from an individual user may be received through an individual user interface 128 (e.g., presented on an individual client computing platform 104). In some implementations, user input from an individual user may be received through an electronic document and/or file, such as, e.g., a configuration file.

Launch component 112 may be configured to execute and/or launch software applications for users 127. In some implementations, launch component 112 may be configured to facilitate execution and/or launching of one or more software applications, e.g., for individual ones of users 127 (e.g., on individual client computing platforms 104 associated with the individual users). In some implementations, operation of launch component 112 may be in accordance with received user input (e.g., as received by selection component 110 and/or other components of system 100). In some implementations, operation of launch component 112 may be in accordance with selections that are represented by received user input. For example, launch component 112 may be configured to execute a first software pipeline for a first user (e.g., subsequent to the first user providing user input selecting the first software pipeline for execution). For example, launch component 112 may be configured to execute a second software pipeline for a second user (e.g., subsequent to the second user providing user input selecting the second software pipeline for execution). For example, launch component 112 may be configured to execute a particular software application for a particular user (e.g., subsequent to the particular user providing user input selecting the particular software application for execution). In some implementations, users 127 may control software applications and/or software pipelines during execution, e.g., through user interfaces 128. For example, users 127 may interact with software applications and/or software pipelines during execution, through user interfaces 128.

Improvement component 114 may be configured to determine whether software pipelines would be improved if a particular software application were replaced by an alternative version of the particular software application. As used herein, currently selected software applications may be referred to as the current versions of the software applications in a particular software pipeline. In some implementations, alternative versions of the particular software application may be newer versions than the current version of the particular software application. Alternatively, and/or simultaneously, in some implementations, alternative versions of the particular software application may be older versions than the current version of the particular software application. In some implementations, determinations by improvement component 114 may be based on a reduction of computing resources (e.g., one or more of processing power, amount of memory needed, amount of storage needed, amount of bandwidth needed, etc.) required for the execution of a particular task, software application, or software pipeline. For example, the reduction may be estimated and/or determined based on testing results, sample execution, head-to-head testing, and/or other types of comparisons and/or (performance) analysis. In some implementations, determinations by improvement component 114 may be based on a reduction of real-world processing time required for the execution of a particular task, software application, or software pipeline. In some implementations, determinations by improvement component 114 may be based on a reduction of costs and/or fees required for the execution of a particular task, software application, or software pipeline. For example, access to cloud-computing resources may be associated with particular costs and/or fees, which may be taken into account by improvement component 114. In some implementations, determinations by improvement component 114 may be based on a comparison of testing results for a first combination of software applications with testing results for a second combination of software applications that is different from the first combination. In some implementations, determinations by improvement component 114 may be based on an analysis of reported issues (e.g., bug reports) with functionality or performance for the first combination and/or the second combination. For example, reported issues may describe and/or pertain to compatibility issues of particular versions of particular software applications (and/or their interoperability). In some implementations, determinations by improvement component 114 may be based on an analysis of dependencies between different software applications in the first combination and/or the second combination. In some implementations, determinations by improvement component 114 may be based on an analysis of a set of information that is used as input for a particular software pipeline. For example, a newer software application (or software pipeline) may perform better on most sets of input information, but worse on a specific and/or particular set of input information. Use and/or selections of sets of input information may be taken into account by improvement component 114.

Notification component 116 may be configured to present notifications to users 127, including but not limited to notifications regarding determinations by improvement component 114. In some implementations, notification component 116 may be configured to transmit notifications to client computing platforms 104 associated with users 127. In some implementations, notification component 116 may be configured to present notifications on user interfaces 128 associated with users 127. For example, assume a given user has selected the second software pipeline in FIG. 4D (including the software applications labeled "A-B1-C2"). In some implementations, improvement component 114 may determine that this software pipeline would be improved if third software application 41c ("B2") replaced second software application 41b ("B1"), such that, upon replacement, the given user would execute and/or otherwise use a software pipeline including the software applications labeled "A-B2-C2". Subsequent to such a determination, notification component may present a notification to the given user, recommending, suggesting, and/or prompting the given user to change the currently selected software applications in the selected software pipeline.

Modification component 118 may be configured to modify software pipelines. In some implementations, modifications may be made prior to execution of a selected software pipeline. In some implementations, modifications may be made during execution of a selected software pipeline. In some implementations, modifications may be made subsequent to execution of a selected software pipeline (i.e., prior to a future execution). In some implementations, modifications may be based on determinations by improvement component 114. For example, assume a given user has selected the second software pipeline in FIG. 4D (including the software applications labeled "A-B1-C2"). In some implementations, improvement component 114 may determine that this software pipeline would be improved if third software application 41c ("B2") replaced second software application 41b ("B1"), such that, upon replacement, the given user would execute and/or otherwise use a software pipeline including the software applications labeled "A-B2-C2". Subsequent to such a determination, modification component may modify the currently selected software applications in the selected software pipeline, in accordance with the determinations by improvement component 114. In some implementations, the given user may (simultaneously and/or consecutively) choose to launch a software pipeline as originally selected and a modified version of the same software pipeline (where the modifications are based on determinations by improvement component 114), without requiring installations or re-installations of any software applications, through the same single deployment of the stored executable code of software applications. For example, the given user could compare an older version of a software application or software pipeline with a newer version.

In some implementations, modifications by modification component 118 may occur and/or be performed in an automated manner, i.e., without requiring particular user input from users 127. For example, assume a given user has selected a given software pipeline in FIG. 4F that includes the software applications labeled "A-B2-C2." Improvement component 114 may determine that this software pipeline would be improved if (newer version) software application 41g ("C3") replaced (older version) software application 41f ("C2"), such that the effective software pipeline (after automated modification by modification component 118) would include the software applications labeled "A-B2-C3." In some implementations, improvement component 114 may further determine that this effective software pipeline would be further improved if current version software application 41e ("B2") would be reverted and/or replaced by an older version performing the same task: software application 41d ("B1"). Subsequent to further automated modification by modification component 118 (using a reversion to an older version for the second task in this pipeline), the finalized software pipeline would include the software applications labeled "A-B1-C3."

Figure 6A:
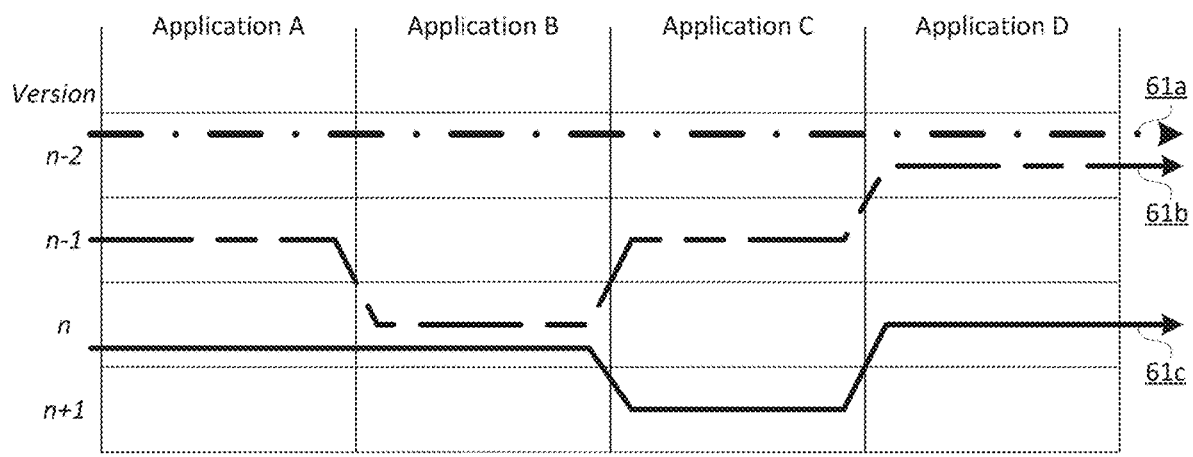
FIGS. 6A-6B illustrate exemplary software pipelines including multiple software applications, as may be used in a system configured for version control of pipelined enterprise software, in accordance with one or more implementations.

By way of non-limiting example, FIG. 6A depicts a set 60a of exemplary software pipelines, such that each as depicted includes versions of four applications (labeled "Application A", "Application B", "Application C", and "Application D"). The columns in FIG. 6A depict different applications, and the rows depict different versions of those applications. The current version may be indicated by a number "n". As depicted, a first software pipeline 61a includes multiple software applications, in particular versions "n–2" of Application A, Application B, Application C, and Application D. In some implementations, first software pipeline 61a may be referred to by its components, for example as follows: $A_{n-2}B_{n-2}C_{n-2}D_{n-2}$. In some implementations, first software pipeline 61a may collectively be referred to by some indicator and/or name (e.g., a release name). For example, first software pipeline 61a may be referred to as Software Pipeline X. Variations may be named based on the differences with Software Pipeline X. For example, a variation of Software Pipeline X in which version n–1 of Application A is used could be referred to as Software Pipeline X-$A_{n-1}$. A second software pipeline 61b may include different versions of these software applications, in particular $A_{n-1}B_nC_{n-1}D_{n-2}$. In some implementations, second software pipeline 61b may collectively be referred to by some indicator and/or name (e.g., a release name). For example, second software pipeline 61b may be referred to as Software Pipeline Y. In some implementations, updated versions of Software Pipeline Y may be referred to by some indicator and/or name that references the differences with Software Pipeline Y.

In some implementations, numbers such as n, n–1, n–2 may include or refer to a particular date (e.g., the release date for that version of an application and/or software pipeline). Alternatively, and/or simultaneously, version indicators of software applications may increase over time, e.g., based on one or more points of origin. For example, the particular versions used for a named software pipeline (such as Software Pipeline X) may be referred to by an indicator or number based on that name, and may serve as a point of origin in the naming scheme. For example, Software Pipeline X may be defined to include $A_xB_xC_xD_x$. In some implementations, a variation of Software Pipeline X in which version n–1 of Application A is used could be referred to as Software Pipeline X-$A_{x+1}$., or as Software Pipeline X-$A_1$. A third software pipeline 61c may include different versions of these software applications, in particular $A_nB_nC_{n+1}D_n$. For example, version n+1 may refer to a beta version of an application. If the software pipeline using the current versions is referred to as Software Pipeline Z, then third software pipeline 61c may be referred to as Software Pipeline X-$C_1$.

Figure 6B:
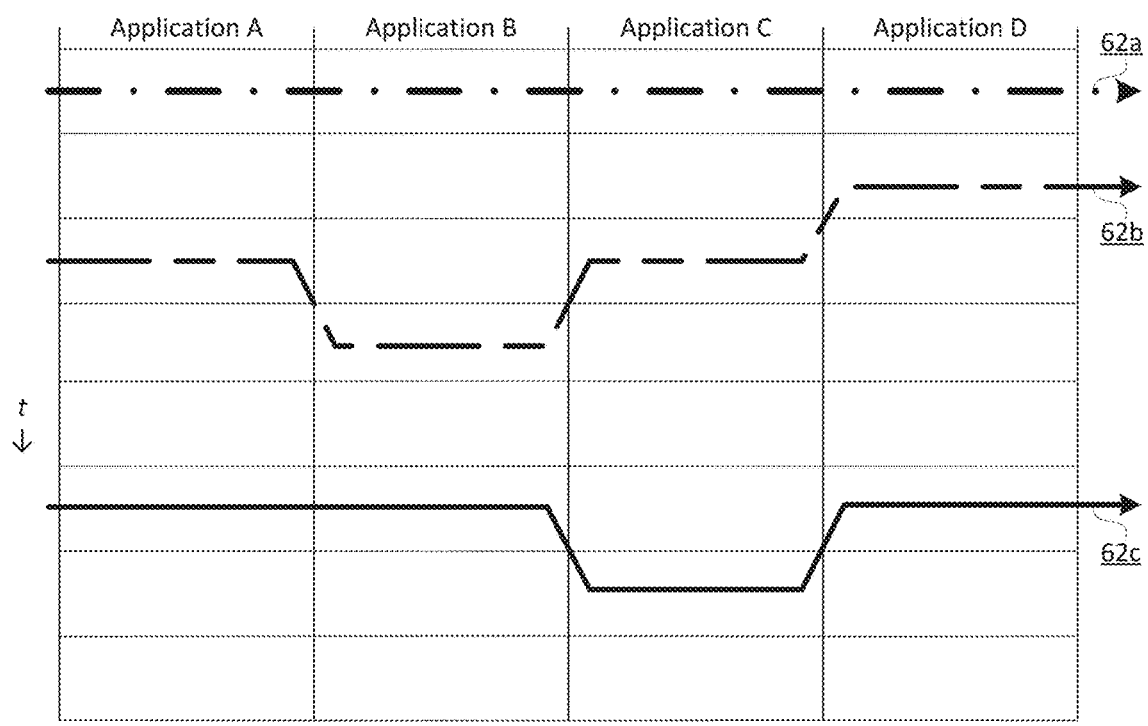

By way of non-limiting example, FIG. 6B depicts a set 60b of exemplary software pipelines, such that each as depicted includes versions of four applications (labeled "Application A", "Application B", "Application C", and "Application D"). The columns in FIG. 6B depict different applications, and the rows depict different versions of those applications, such that newer versions are placed below older versions. In other words, time progresses as indicated on the left side of FIG. 6B, and the version of Application A used in a first software pipeline 62a is older than the version of Application A used in a second software pipeline 62b, which is older than the version of Application A used in a third software pipeline 62c. The naming convention for versions of Application A can use one or more of release dates, incremental numbers, major release names, and/or other (alphanumerical) names. As depicted in FIG. 6B, the naming convention for versions of Application A may be independent of (or even unrelated to) the naming conventions for versions of Application B, Application C, and/or Application D. For example, development of these software applications may be independent (e.g., by different corporate entities). In some implementations, software pipelines may use a naming convention as well, and this naming convention may be independent of the naming convention for individual software applications. For example, first software pipeline 62a may be named "Rosebud", second software pipeline 62b may be named "Nairobi", and third software pipeline 62c may be named "Dragon". In some implementations, variations of these software pipelines may be named based on the difference with a named software pipeline.

Referring to FIG. 1, presentation component 120 may be configured to present information to users 127. Presented information may include output generated by software applications and/or software pipelines. In some implementations, information may be presented on client computing platforms 104. In some implementations, information may be presented through user interfaces 128. In some implementations, output generated by a first software pipeline may be presented to a first user at the same time that output generated by a second software pipeline (which may be different from the first software pipeline) is presented to a second user.

In some implementations, presentation component 120 may be configured to present user interfaces 128 to users 127. In some implementations, presentation component 120 may be configured to present software applications as eligible to be executed and/or used by users 127. In some implementations, a presented user interface may facilitate entry and/or selection by users 127 of one or more software applications to be used by users 127. For example, in reference to exemplary user interface 50 of FIG. 5, different users may be presented with a given user interface depicting eligible software applications (here, software applications that form software pipelines 40d as depicted in FIG. 4D). In such a given user interface, action buttons similar to action button 52 may be used to select and/or deselect an individual software application from a software pipeline (such user input may be received by selection component 110). For example, as depicted in FIG. 5, a first user "User 1" may have selected the first software pipeline (including the software applications labeled "A-B1-C1"), a second user "User 2" may have selected the third software pipeline (including the software applications labeled "A-B2-C1"), and a third user "User 3" may have selected the fourth software pipeline (including the software applications labeled "A-B2-C2").

Referring to FIG. 1, billing component 122 may be configured to determine compensations and/or compensation amounts, e.g., for execution and/or usage of software applications. In some implementations, billing component 122 may be configured to determine compensation amounts for the number of times one or more given software applications have been executed and/or used by one or more given users. In some implementations, determinations by billing component 122 may be aggregated for multiple individual users and/or for multiple individual software applications. In some implementations, at least some part of a given compensation amount may be payable to an external organization that is external to the given corporate client. In some implementations, at least some part of a given compensation amount may be payable to a particular organizational subdivision of the particular corporate client that is different from the given organizational subdivision. For example, users in a compliance department of a particular corporate client may execute a particular software application that has been developed by a research group in the same particular corporate client. Accordingly, at least some part of the determined compensation amount for billable usage of the particular software application by the users in the compliance department may be payable to the research group (in other words, the research group may be the payee).

Having a payee internal to a corporate client may be referred to as internal billing, or cross-billing.

In some implementations, billing component 122 may be configured to present billing information and/or invoice information to an administrative user associated with a given corporate client such that the presented information is based on determined compensations amounts. In some implementations, the presented information may be specific to individual organizational subdivisions of a given corporate client. In some implementations, presentations by billing component 122 may occur on regular and/or predetermined intervals, such as weekly, monthly, and/or other intervals and/or durations.

In some implementations, server(s) 102, client computing platform(s) 104, and/or external resources 132 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users and system 100 and/or between users and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 132 may include sources of information outside of system 100, external entities participating with system 100, and/or other resources. In some implementations, external resources 132 may include a provider of documents, including but not limited to electronic source documents 123, on which system 100 and/or its components may operate. In some implementations, external resources 132 may include a provider of information, including but not limited to extracted information 125, on which system 100 and/or its components may operate. In some implementations, some or all of the functionality attributed herein to external resources 132 may be provided by resources included in system 100.

Server(s) 102 may include electronic storage 130, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, 120, and/or 122, and/or other components. Processor(s) 124 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 124 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 124 may be configured to execute one or more additional components that may perform some or all of the functionality attributed below to one of components 108, 110, 112, 114, 116, 118, 120, and/or 122.

Figure 2:
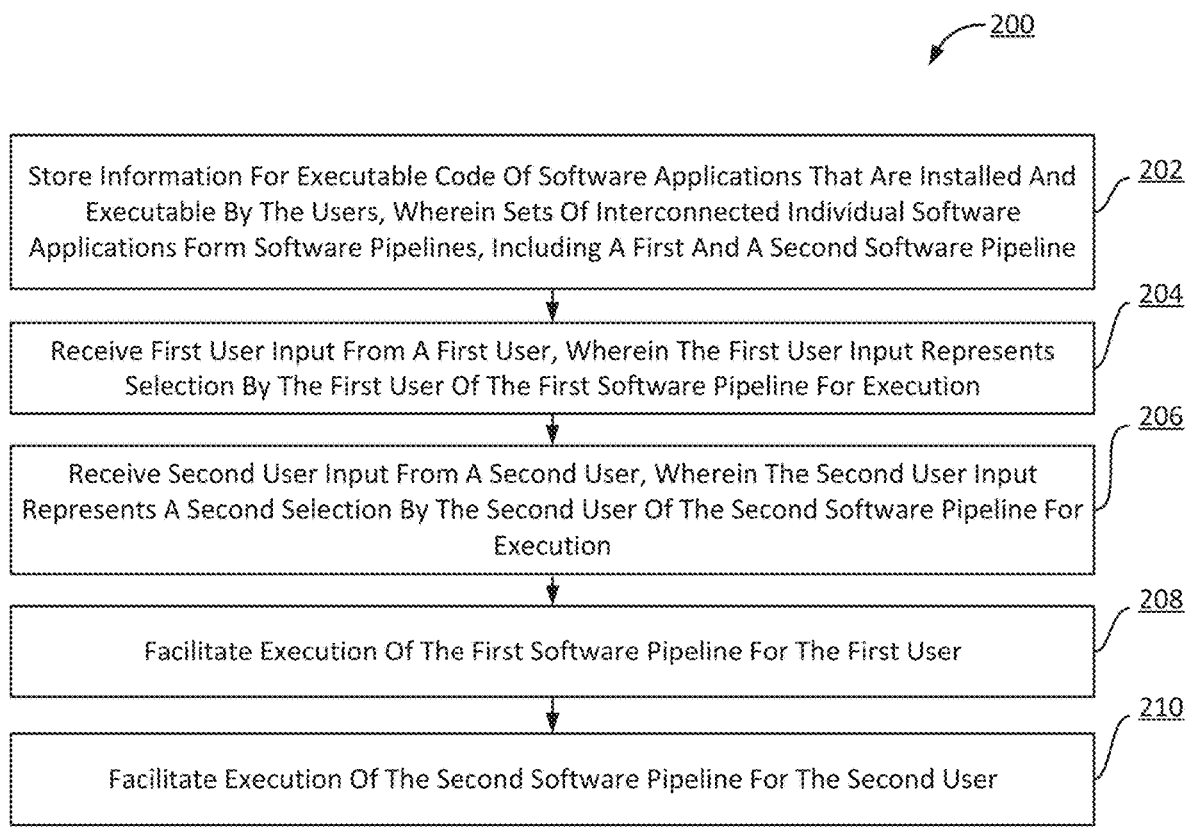
FIG. 2 illustrates a method for version control of pipelined enterprise software, in accordance with one or more implementations.

FIG. 2 illustrates a method 200 for version control of pipelined enterprise software, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing information. The stored information may include executable code of software applications that are installed and executable by the users. Sets of interconnected individual software applications may form software pipelines. The software applications may include a first software application, a second software application, a third software application, and a fourth software application. A first software pipeline may include the first software application followed by the second software application followed by the fourth software application such that, in the first software pipeline, output generated by the first software application is used as input for the second software application, and further such that output generated by the second software application is used as input for the fourth software application. A second software pipeline may include the first software application followed by the third software application followed by the fourth software application such that, in the second software pipeline, output generated by the first software application is used as input for the third software application, and further such that output generated by the third software application is used as input for the fourth software application. In some embodiments, operation 202 is performed by a storage component the same as or similar to storage component 108 (shown in FIG. 1 and described herein).

An operation 204 may include receiving first user input from a first user. The first user input represents selection by the first user of the first software pipeline for execution. In some embodiments, operation 204 is performed by a selection component the same as or similar to selection component 110 (shown in FIG. 1 and described herein).

An operation 206 may include receiving second user input from a second user. The second user input represents a second selection by the second user of the second software pipeline for execution. In some embodiments, operation 206 is performed by a selection component the same as or similar to selection component 110 (shown in FIG. 1 and described herein).

An operation 208 may include facilitating execution of the first software pipeline for the first user. In some embodiments, operation 208 is performed by a launch component the same as or similar to launch component 112 (shown in FIG. 1 and described herein).

An operation 210 may include facilitating execution of the second software pipeline for the second user. In some embodiments, operation 210 is performed by a launch component the same as or similar to launch component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for version control of pipelined enterprise software, wherein the enterprise software can be used by users, wherein the users include a first user and a second user, the system comprising:

electronic storage configured to store information, wherein the information includes executable code of software applications that are installed and executable by the users, wherein the executable code includes sets of interconnected individual software applications that form software pipelines, wherein the executable code of the software applications includes a first software application, an alternative first software application, a second software application, a third software application, and a fourth software application, wherein the fourth application has a current version, wherein a first software pipeline includes the first software application followed by the second software application followed by the fourth software application such that, in the first software pipeline, output generated by the first software application is used as input for the second software application, and further such that output generated by the second software application is used as input for the fourth software application, wherein a second software pipeline includes the first software application followed by the third software application followed by the fourth software application such that, in the second software pipeline, output generated by the first software application is used as input for the third software application, and further such that output generated by the third software application is used as input for the fourth software application; and one or more hardware processors configured by machine-readable instructions to:

receive first user input from a first user, wherein the first user input represents selection by the first user of the first software pipeline for execution of the first software pipeline;

receive second user input from a second user, wherein the second user input represents a second selection by the second user of the second software pipeline for execution of the second software pipeline;

make a first determination whether the second software pipeline would be improved if the alternative first software application replaced the first software application during the execution of the second software pipeline;

responsive to the first determination that the second software pipeline would be improved if the alternative first software application replaced the first software application during the execution of the second software pipeline, present a notification to the second user, wherein the notification notifies the second user that the second software pipeline would be improved if the alternative first software application replaced the first software application during the execution of the second software pipeline;

make a second determination that the second software pipeline would be improved if an older version of the fourth software application replaced the current version of the fourth software application, wherein the older version and the current version of the fourth software application perform different versions of similar tasks and are both included in the executable code;

responsive to the second determination that the second software pipeline would be improved if the older version of the fourth software application replaced the current version of the fourth software application, modify the second software pipeline by replacing the current version of the fourth software application with the older version of the fourth software application, prior to the execution of the second software pipeline for the second user;

facilitate the execution, through the executable code, of the first software pipeline for the first user; and facilitate the execution, through the executable code, of the second software pipeline for the second user.

2. The system of claim 1, wherein the second software application and the third software application perform different versions of the same one or more tasks.

3. The system of claim 1, wherein the one or more tasks include a task pertaining to automated document processing.

4. The system of claim 1, wherein one or both of the first determination and the second determination are based on one or more of:

(i) a reduction of computing resources required for the execution of the second software pipeline, (ii) a reduction of real-world processing time required for the execution of the second software pipeline, and/or (iii) a reduction of costs and/or fees required for the execution of the second software pipeline.

5. The system of claim 1, wherein the determination is based on one or more of:

(i) a comparison of testing results for a first combination with testing results for a second combination, wherein the first combination includes the first software application and the third software application, wherein the second combination includes the alternative first software application and the third software application, (ii) an analysis of reported issues with functionality or performance for the first combination and/or the second combination, and/or (iii) an analysis of a set of information that is used as input for the second software pipeline.

6. The system of claim 1, wherein the execution of the first software pipeline for the first user occurs at the same time as the execution of the second software pipeline for the second user such that output generated by the first software pipeline is presented on a first client computing platform associated with the first user at the same time that output generated by the second software pipeline is presented on a second client computing platform associated with the second user.

7. The system of claim 1, wherein the selection of the first software pipeline by the first user is effectuated through one or more of a first user interface or a first configuration file, and wherein the second selection of the second software pipeline by the second user is effectuated through one or more of a second user interface or a second configuration file.

8. A method for version control of pipelined enterprise software, wherein the enterprise software can be used by users, wherein the users include a first user and a second user, the method comprising:

storing information, wherein the information includes executable code of software applications that are installed and executable by the users, wherein the executable code includes sets of interconnected individual software applications that form software pipelines, wherein the executable code of the software applications includes a first software application, an alternative first software application, a second software application, a third software application, and a fourth software application, wherein the fourth application has a current version, wherein a first software pipeline includes the first software application followed by the second software application followed by the fourth software application such that, in the first software pipeline, output generated by the first software application is used as input for the second software application, and further such that output generated by the second software application is used as input for the fourth software application, wherein a second software pipeline includes the first software application followed by the third software application followed by the fourth software application such that, in the second software pipeline, output generated by the first software application is used as input for the third software application, and further such that output generated by the third software application is used as input for the fourth software application;

receiving first user input from a first user, wherein the first user input represents selection by the first user of the first software pipeline for execution of the first software pipeline;

receiving second user input from a second user, wherein the second user input represents a second selection by the second user of the second software pipeline for execution of the second software pipeline;

making a first determination whether the second software pipeline would be improved if the alternative first software application replaced the first software application during the execution of the second software pipeline;

responsive to the first determination that the second software pipeline would be improved if the alternative first software application replaced the first software application during the execution of the second software pipeline, presenting a notification to the second user, wherein the notification notifies the second user that the second software pipeline would be improved if the alternative first software application replaced the first software application during the execution of the second software pipeline;

making a second determination that the second software pipeline would be improved if an older version of the fourth software application replaced the current version of the fourth software application, wherein the older version and the current version of the fourth software application perform different versions of similar tasks and are both included in the executable code;

responsive to the second determination that the second software pipeline would be improved if the older version of the fourth software application replaced the current version of the fourth software application, modifying the second software pipeline by replacing the current version of the fourth software application with the older version of the fourth software application, prior to the execution of the second software pipeline for the second user;

facilitating the execution, through the executable code, of the first software pipeline for the first user; and facilitating the execution, through the executable code, of the second software pipeline for the second user.

9. The method of claim 8, wherein the second software application and the third software application perform different versions of the same one or more tasks.

10. The method of claim 8, wherein the one or more tasks include a task pertaining to automated document processing.

11. The method of claim 8, wherein one or both of the first determination and the second determination are based on one or more of:
   (i) a reduction of computing resources required for the execution of the second software pipeline,
   (ii) a reduction of real-world processing time required for the execution of the second software pipeline, and/or
   (iii) a reduction of costs and/or fees required for the execution of the second software pipeline.

12. The method of claim 8, wherein one or more of the first determination and the second determination are based on one or more of:
   (i) a comparison of testing results for a first combination with testing results for a second combination, wherein the first combination includes the first software application and the third software application, wherein the second combination includes the alternative first software application and the third software application,
   (ii) an analysis of reported issues with functionality or performance for the first combination and/or the second combination, and/or
   (iii) an analysis of a set of information that is used as input for the second software pipeline.

13. The method of claim 8, wherein the execution of the first software pipeline for the first user occurs at the same time as the execution of the second software pipeline for the second user such that output generated by the first software pipeline is presented on a first client computing platform associated with the first user at the same time that output generated by the second software pipeline is presented on a second client computing platform associated with the second user.

14. The method of claim 8, wherein the selection of the first software pipeline by the first user is effectuated through one or more of a first user interface or a first configuration file, and wherein the second selection of the second software pipeline by the second user is effectuated through one or more of a second user interface or a second configuration file.

15. A system configured for version control of pipelined enterprise software, wherein the enterprise software can be used by users, wherein the users include a first user and a second user, the system comprising:

electronic storage configured to store information, wherein the information includes executable code of software applications that are installed and executable by the users, wherein the executable code includes sets of interconnected individual software applications that form software pipelines, wherein the executable code of the software applications includes a first software application, an alternative first software application, a second software application, a third software application, and a fourth software application, wherein the fourth application has a current version, wherein a first software pipeline includes the first software application followed by the second software application followed by the fourth software application such that, in the first software pipeline, output generated by the first software application is used as input for the second software application, and further such that output generated by the second software application is used as input for the fourth software application, wherein a second software pipeline includes the first software application followed by the third software application followed by the fourth software application such that, in the second software pipeline, output generated by the first software application is used as input for the third software application, and further such that output generated by the third software application is used as input for the fourth software application; and one or more hardware processors configured by machine-readable instructions to:

receive first user input from a first user, wherein the first user input represents selection by the first user of the first software pipeline for execution of the first software pipeline;

receive second user input from a second user, wherein the second user input represents a second selection by the second user of the second software pipeline for execution of the second software pipeline;

make a first determination whether the second software pipeline would be improved if the alternative first software application replaced the first software application;

responsive to the first determination that the second software pipeline would be improved if the alternative first software application replaced the first software application, modify the second software pipeline by replacing the first software application with the alternative first software application, prior to the execution of the second software pipeline for the second user;

make a second determination that the second software pipeline would be improved if an older version of the fourth software application replaced the current version of the fourth software application, wherein the older version and the current version of the fourth software application perform different versions of similar tasks and are both included in the executable code;

responsive to the second determination that the second software pipeline would be improved if the older version of the fourth software application replaced the current version of the fourth software application, modify the second software pipeline by replacing the current version of the fourth software application with the older version of the fourth software application, prior to the execution of the second software pipeline for the second user;

facilitate the execution, through the executable code, of the first software pipeline for the first user; and facilitate the execution, through the executable code, of the second software pipeline for the second user.

16. A method for version control of pipelined enterprise software, wherein the enterprise software can be used by users, wherein the users include a first user and a second user, the method comprising:

storing information, wherein the information includes executable code of software applications that are installed and executable by the users, wherein the executable code includes sets of interconnected individual software applications that form software pipelines, wherein the executable code of the software applications includes a first software application, an alternative first software application, a second software application, a third software application, and a fourth software application, wherein the fourth application has a current version, wherein a first software pipeline includes the first software application followed by the second software application followed by the fourth software application such that, in the first software pipeline, output generated by the first software application is used as input for the second software application, and further such that output generated by the second software application is used as input for the fourth software application, wherein a second software pipeline includes the first software application followed by the third software application followed by the fourth software application such that, in the second software pipeline, output generated by the first software application is used as input for the third software application, and further such that output generated by the third software application is used as input for the fourth software application;

receiving first user input from a first user, wherein the first user input represents selection by the first user of the first software pipeline for execution of the first software pipeline;

receiving second user input from a second user, wherein the second user input represents a second selection by the second user of the second software pipeline for execution of the second software pipeline;

make a first determination whether the second software pipeline would be improved if the alternative first software application replaced the first software application; and responsive to the first determination that the second software pipeline would be improved if the alternative first software application replaced the first software application, modifying the second software pipeline by replacing the first software application with the alternative first software application, prior to the execution of the second software pipeline for the second user;

make a second determination that the second software pipeline would be improved if an older version of the fourth software application replaced the current version of the fourth software application, wherein the older version and the current version of the fourth software application perform different versions of similar tasks and are both included in the executable code;

responsive to the second determination that the second software pipeline would be improved if the older version of the fourth software application replaced the current version of the fourth software application, modifying the second software pipeline by replacing the current version of the fourth software application with the older version of the fourth software application, prior to the execution of the second software pipeline for the second user;

facilitating the execution, through the executable code, of the first software pipeline for the first user; and facilitating the execution, through the executable code, of the second software pipeline for the second user.

* * * * *